(12) United States Patent
Mizobe et al.

(10) Patent No.: US 11,120,541 B2
(45) Date of Patent: Sep. 14, 2021

(54) DETERMINATION DEVICE AND DETERMINING METHOD THEREOF

(71) Applicant: SEIKO EPSON CORPORATION, Tokyo (JP)

(72) Inventors: Kimitake Mizobe, Chino (JP); Taro Tanaka, Matsumoto (JP); Natsumi Mano, Shiojiri (JP); Hiroyuki Masuda, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 125 days.

(21) Appl. No.: 16/697,268

(22) Filed: Nov. 27, 2019

(65) Prior Publication Data

US 2020/0167908 A1 May 28, 2020

(30) Foreign Application Priority Data

Nov. 28, 2018 (JP) .............................. JP2018-221952

(51) Int. Cl.
*G06T 7/00* (2017.01)

(52) U.S. Cl.
CPC .. *G06T 7/0004* (2013.01); *G06T 2207/20081* (2013.01); *G06T 2207/20092* (2013.01)

(58) Field of Classification Search
CPC ......... G06T 7/0004; G06T 2207/20092; G06T 2207/20081; G06T 2207/20084
USPC ....... 382/100, 141, 142, 149, 144, 151, 190, 382/199, 218, 305
See application file for complete search history.

(56) References Cited

U.S. PATENT DOCUMENTS

| | | | |
|---|---|---|---|
| 2003/0145293 A1* | 7/2003 | Isobe | G01R 31/318342 716/102 |
| 2010/0228519 A1* | 9/2010 | Oshima | G01B 11/2441 702/155 |
| 2017/0069075 A1* | 3/2017 | Okuda | G06T 11/60 |
| 2018/0040119 A1* | 2/2018 | Trenholm | H04N 5/2256 |
| 2019/0139229 A1* | 5/2019 | Ohira | G06T 7/20 |
| 2019/0162868 A1* | 5/2019 | Salman | G01V 1/48 |
| 2019/0277776 A1* | 9/2019 | Gawhane | H01L 22/20 |

(Continued)

FOREIGN PATENT DOCUMENTS

| | | |
|---|---|---|
| JP | 2015-041164 A | 3/2015 |
| JP | 2016-109495 A | 6/2016 |

*Primary Examiner* — Sheela C Chawan
(74) *Attorney, Agent, or Firm* — Oliff PLC

(57) ABSTRACT

A determination device that determines quality of target portion based on sensor data obtained by a sensor measuring the target object, includes one or more processors configured to acquire sensor data representing the target portion, acquire information indicating a changed portion, determine whether the target portion includes the changed portion based on acquired information, determine a first label of the target portion represented in the sensor data by using a determination model learned from a training dataset based on training target portions, the first label representing target portion as one of good, defect, and a defect candidate, accept a second label of the target portion input via a user interface when the target portion includes the changed portion or when the first label of the target portion is determined as the defect candidate, and perform quality determination of the target portion based on the first label and/or the second label.

6 Claims, 15 Drawing Sheets

(56) References Cited

U.S. PATENT DOCUMENTS

2019/0295289 A1\* 9/2019 Khan ...................... G06N 3/08
2020/0018707 A1\* 1/2020 Hanabusa .......... G01N 21/8803

\* cited by examiner

DETERMINATION DEVICE AND DETERMINING METHOD THEREOF

The present application is based on, and claims priority from JP Application Serial Number 2018-221952, filed on Nov. 28, 2018, the disclosure of which is hereby incorporated by reference herein in its entirety.

BACKGROUND

1. Technical Field

The present disclosure relates to a determination device and a determining method thereof.

2. Related Art

JP-A-2015-41164 discloses a device that determines quality of an object according to a feature value acquired from the object. The device detects candidate points of a fault in each of regions based on a plurality of first feature values extracted from the object, sets a fault candidate region and a non-fault candidate region based on the detected candidate points of the fault, and calculates second feature values from each of the fault candidate region and the non-fault candidate region. The device then generates, on-line, an identifier that identifies a normal model based on the second feature values extracted from a plurality of non-fault candidate regions, and determines, by the identifier, whether or not there is a fault in the object. In this manner, even when there occurs a change in the manufacturing processes or environments, it is possible to detect faults of the object.

The technique described in PTL 1 does not sufficiently take into consideration about performing an efficient determination when a portion of a determination target object is changed.

SUMMARY

According to a first aspect of the present disclosure, there is provided a determination device that determines quality of a target portion of a target object based on sensor data obtained by a sensor measuring the target object. The determination device includes one or more processors configured to: acquire, from the sensor or a memory, the sensor data representing the target portion, acquire information indicating a changed portion on the target object, determine whether the target portion includes the changed portion based on the acquired information, determine a first label of the target portion represented in the sensor data by using a determination model learned from a training dataset based on training target portions, the first label representing the target portion as one of good, defect, and a defect candidate, accept a second label of the target portion input via a user interface when the target portion includes the changed portion or when the first label of the target portion is determined as the defect candidate, and perform quality determination of the target portion based on the first label and/or the second label, wherein the changed portion is a portion of the target object where a design or a process applied to form the target portion has been changed from that of the training target portions used to form the training dataset.

According to a second aspect of the present disclosure, there is provided a method that determines, when performed by one or more processors, quality of a target portion of a target object based on sensor data obtained by a sensor measuring the target object. The method includes acquiring, from the sensor or a memory, the sensor data representing the target portion, acquiring information indicating a changed portion on the target object, determining whether the target portion includes the changed portion based on the acquired information, determining a first label of the target portion represented in the sensor data by using a determination model learned from a training dataset based on training target portions, the first label representing the target portion as one of good, defect, and a defect candidate, accepting a second label of the target portion input via a user interface when the target portion includes the changed portion or when the first label of the target portion is determined as the defect candidate, and performing quality determination of the target portion based on the first label and/or the second label, wherein the changed portion is a portion of the target object where a design or a process applied to form the target portion has been changed from that of the training target portions used to form the training dataset. According to still another aspect of the present disclosure, there is provided a non-transitory computer readable medium that stores instructions that cause one or more processors to perform such a method.

DESCRIPTION OF EXEMPLARY EMBODIMENTS

A. First Embodiment

A1. Configuration of Determination System

Figure 1:
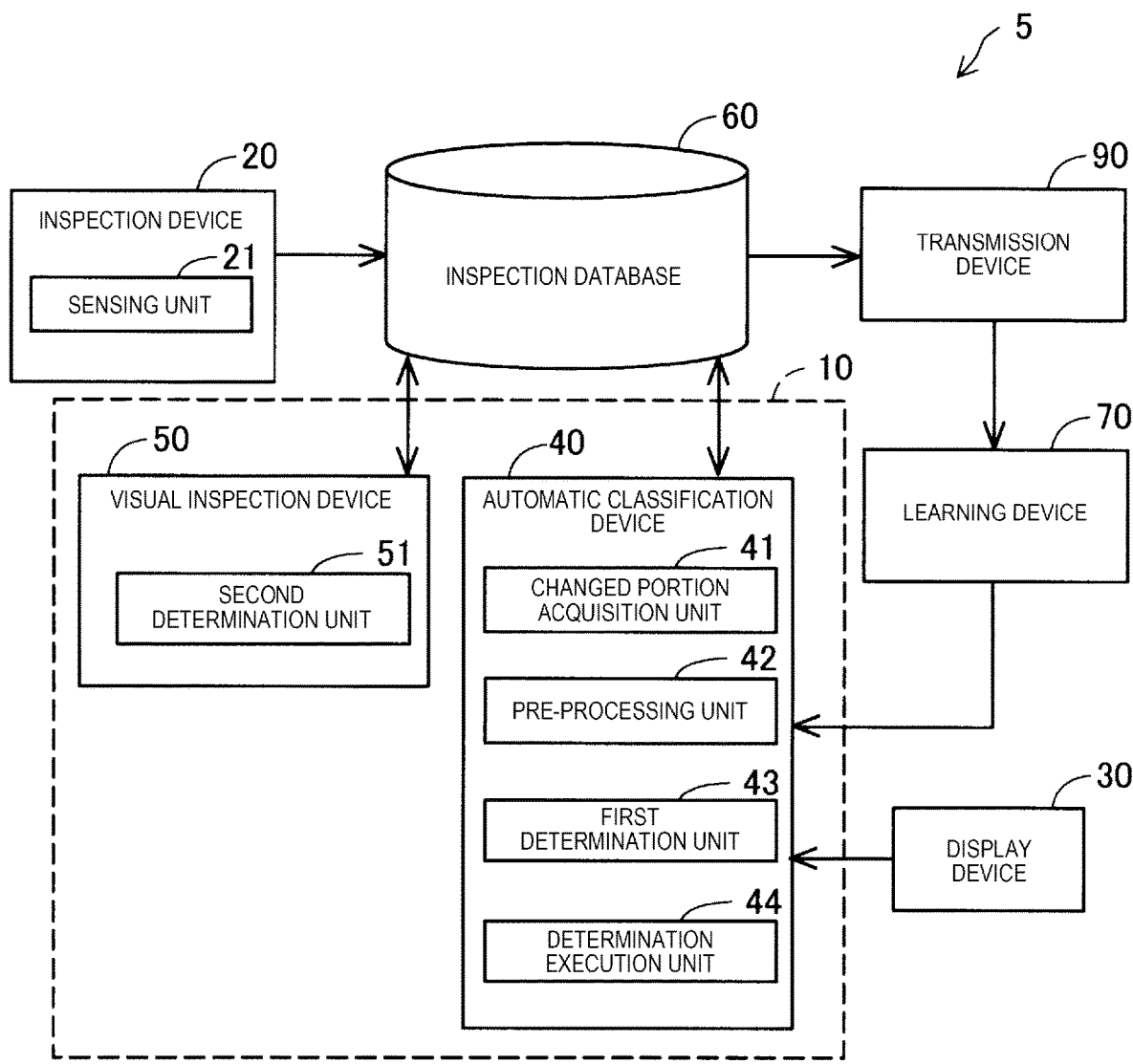
FIG. 1 is a diagram showing schematic configuration of a determination system according to an embodiment of the present disclosure.

FIG. 1 is a diagram showing schematic configuration of a determination system 5 according to an embodiment of the present disclosure. The determination system 5 includes an inspection device 20, an automatic classification device 40, a visual inspection device 50, a learning device 70, a transmission device 90, and an inspection database 60. Each device in the determination system 5 is coupled by a network. The automatic classification device 40 and the visual inspection device 50 are also referred to as a determination device 10. The determination device 10 is a device that performs quality determination of a determination target object.

The inspection device 20 includes a sensing unit 21 that acquires a result of sensing with respect to the determination target object. In this embodiment, the sensing unit 21 includes a camera that acquires an image in which the determination target object is captured. In this embodiment, the inspection device 20 stores, in the inspection database 60, an inspection image which is a result of sensing for each determination target object.

The automatic classification device 40 includes a changed portion acquisition unit 41, a pre-processing unit 42, a first determination unit 43, and a determination execution unit 44. Functions of these units may be implemented by one or more processors including CPU (not shown) included in the automatic classification device 40, by loading a program recorded in the memory (not shown) and executing the same. The program may also be obtained from a non-transitory computer readable medium that stores the program including instructions for one or more processors.

The changed portion acquisition unit 41 acquires a changed portion in the determination target object from a previous determination target object. In this embodiment, design of apart of determination target object is changed from the previous determination target object, and the determination target object is formed of a changed portion and a non-changed portion from the previous determination target object. The determination execution unit 44 may perform quality determination processing by using at least one of the first determination unit 43 and the second determination unit 51, with respect to a determination target portion of a determination target object. The acquisition of the changed portion by the changed portion acquisition unit 41 and the quality determination processing by the determination execution unit 44 will be described below.

Figure 2:
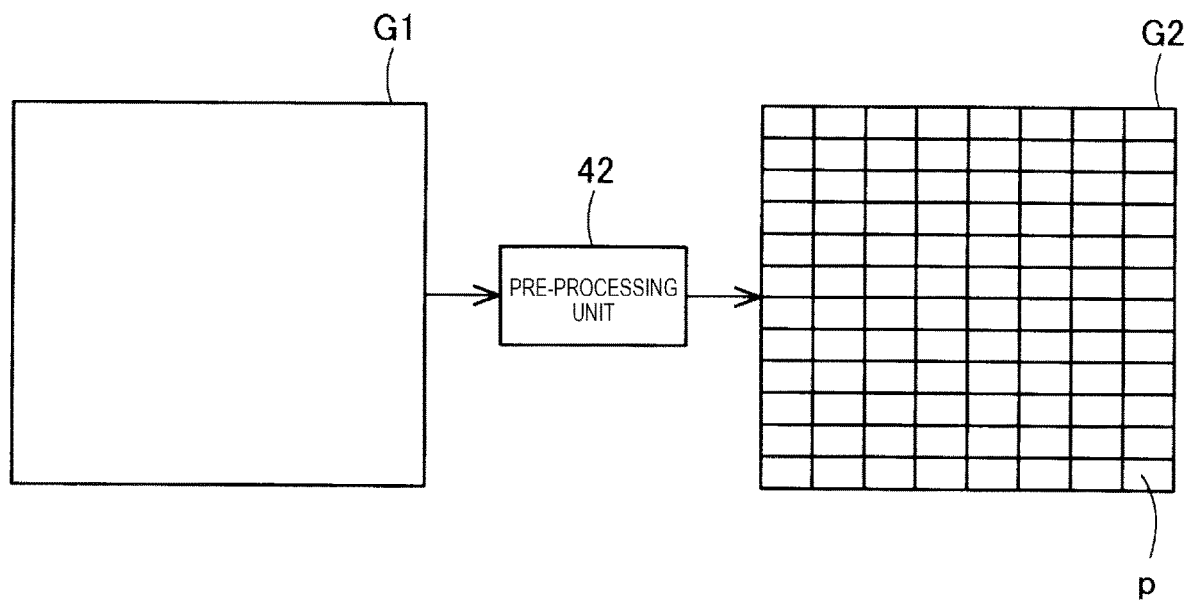
FIG. 2 is a diagram showing an inspection image before pre-processing and an inspection image after the pre-processing.

FIG. 2 is a diagram showing an inspection image G1 before pre-processing and an inspection image G2 after the pre-processing. The pre-processing unit 42 performs predetermined processing of performing determination by the first determination unit 43 or the second determination unit 51 with respect to the inspection image G1 as a result of sensing. In this embodiment, as shown in FIG. 2, the pre-processing unit 42 may divide the inspection image G1 into a plurality of determination target portions p to obtain the inspection image G2 after the pre-processing.

Figure 3:
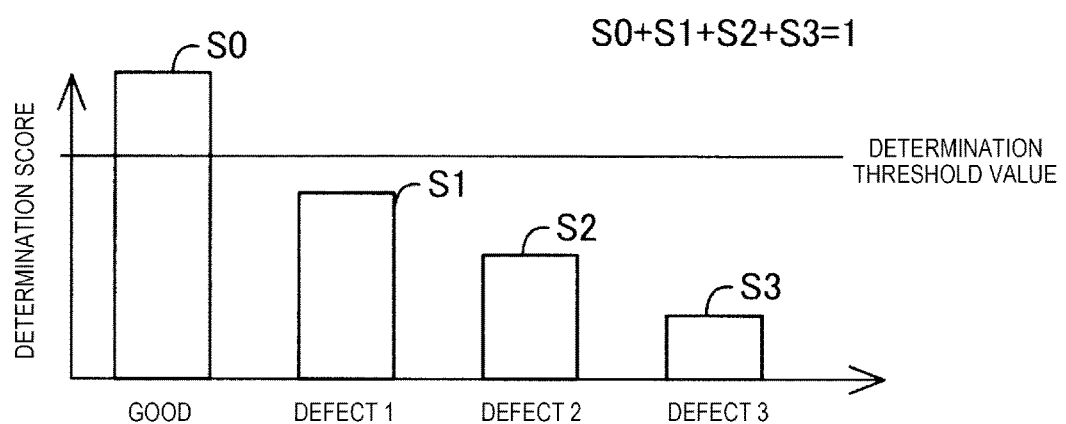
FIG. 3 is a first diagram for explaining a determination score calculated with a determination model, a determination threshold value, and a determination result by a first determination unit.
Figure 4:
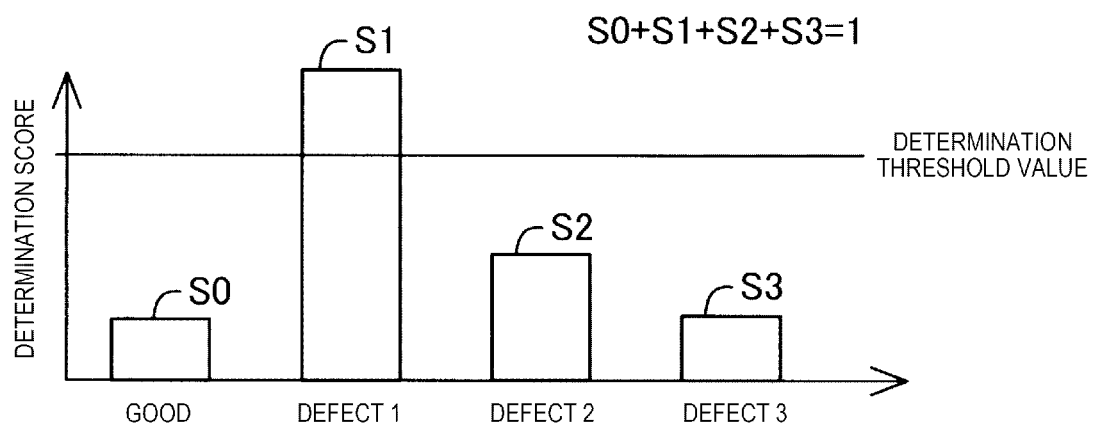
FIG. 4 is a second diagram for explaining the determination score calculated with the determination model, a determination threshold value, and the determination result by the first determination unit.
Figure 5:
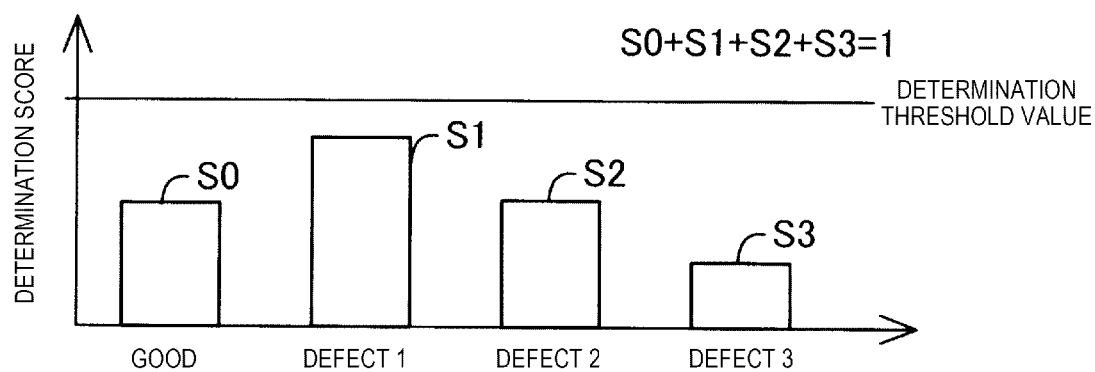
FIG. 5 is a third diagram for explaining the determination score calculated with the determination model, a determination threshold value, and the determination result by the first determination unit.

FIGS. 3 to 5 are diagrams for explaining a determination score calculated with a determination model with respect to a determination target portion p, a determination threshold value, and a determination result by the first determination unit 43. The determination model is a model learned from a training dataset including a quality determination result of a determiner with respect to the determination target portions p as training target portions. For the determination model, a neural network such as a convolutional neural network may be used, for example. The first determination unit 43 respectively calculates one or more determination scores indicating the probability of being good and the probability of being defect with respect to the determination target portion p by using the determination model. In this embodiment, the determination model respectively calculates a determination score S0 for determining a label representing good, and determination scores S1, S2, and S3 for determining labels representing respective three types of defects, that is, defect 1, defect 2, and defect 3. These determination scores S0, S1, S2, and S3 are standardized such that the sum is 1. The types of the defect include "crack," "foreign matter," "lack," and the like, for example. In the example shown in FIG. 3, when the determination score S0 for determining a label representing good with respect to the determination target portion p is equal to or greater than a threshold value, the first determination unit 43 determines that the corresponding determination target portion is "good". In the example shown in FIG. 4, when the determination score S1 indicating defect 1 with respect to the determination target portion p is equal to or greater than a threshold value, the first determination unit 43 determines that the corresponding determination target portion is "defect 1". In the example shown in FIG. 5, when no determination score exceeds a threshold value with respect to the determination target portion p, the first determination unit 43 determines the corresponding determination target portion is a "defect candidate". The first determination unit 43 assigns each determination target portion p in the inspection image G2 with a determination result by the determination model and stores the determination result in the inspection database 60. An image in which the determination result by the determination model or the determination result of the determiner is assigned in each determination target portion p of the inspection image G2, is referred to as an "image with quality determination result".

The visual inspection device 50 shown in FIG. 1 includes the second determination unit 51. The second determination unit 51 may implement the function thereof as a CPU (not shown) included in the visual inspection device 50 loads a program recorded in a memory (not shown) and executes the same.

Figure 6:
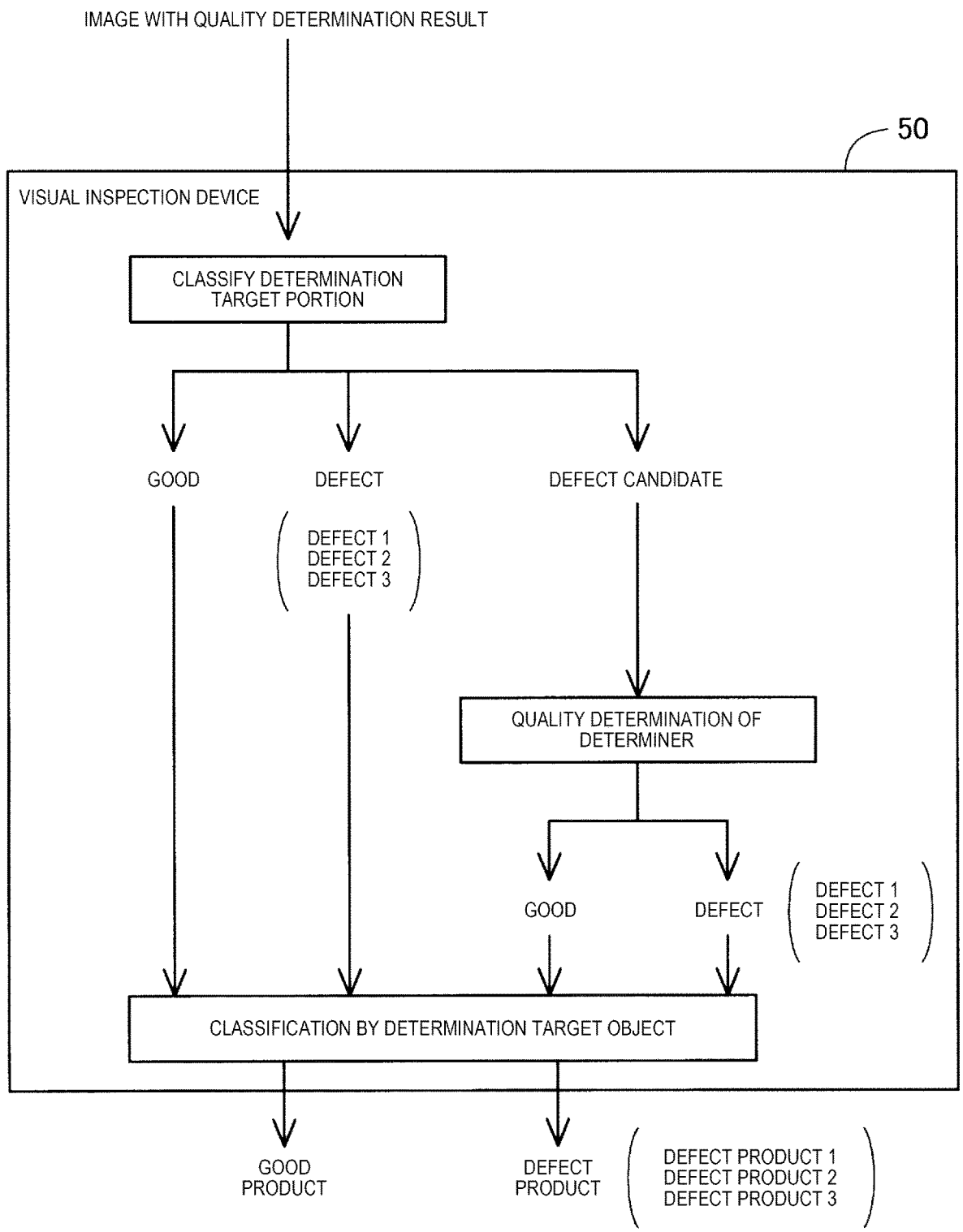
FIG. 6 is an image diagram showing quality determination of a determination target portion in a visual inspection device.

FIG. 6 is an image diagram showing the quality determination of a determination target portion p in the visual inspection device 50. In the example shown in FIG. 6, the second determination unit 51 acquires an image with a quality determination result stored in the inspection database 60, and classifies each determination target portion p into good, defect, and a defect candidate. The second determination unit 51 displays the determination target portion p that is the defect candidate, on a display device (not shown) included in the visual inspection device 50. The determiner inputs a quality determination result about the displayed determination target portion p through an input device having a user interface (not shown). The second determination unit 51 acquires or accept the input quality determination result, assigns the acquired quality determination result to the image G2 with the quality determination result, and updates the result. Further, the second determination unit 51 classifies each determination target object into a good product and a defect product by using the quality determination of the determination target portion p in each of the images with a quality determination result.

Figure 7:
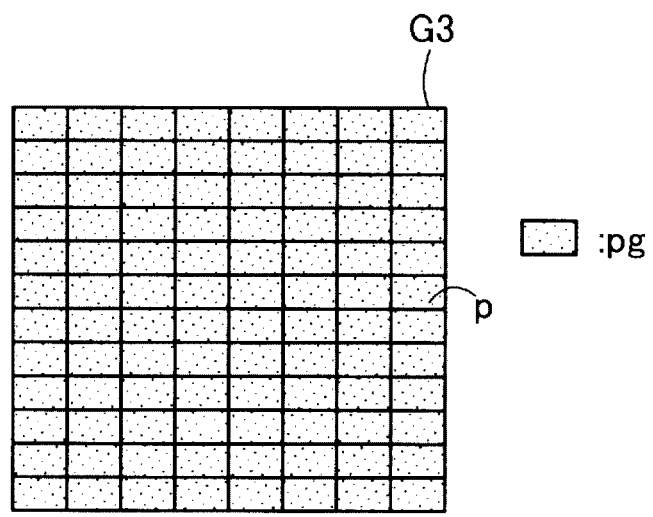
FIG. 7 shows an image with a quality determination result with respect to a determination target object that is determined as a good product by a second determination unit.
Figure 8:
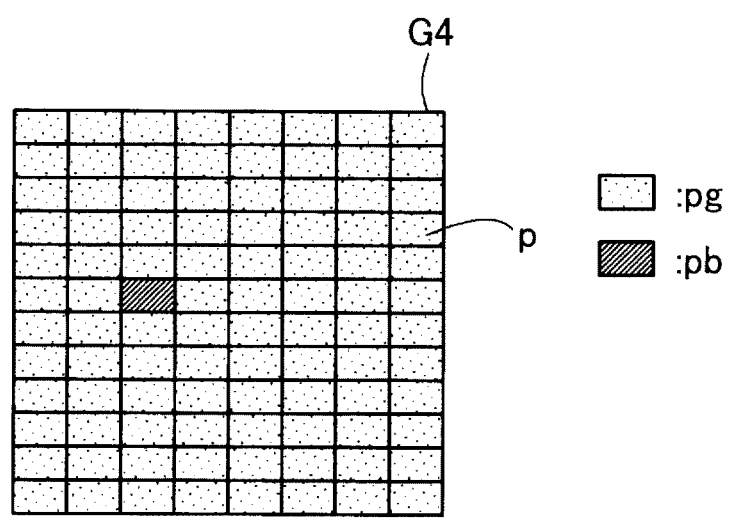
FIG. 8 shows an image with a quality determination result with respect to a determination target object that is determined as a defect product by the second determination unit.

FIG. 7 shows an image G3 with a quality determination result with respect to a determination target object that is determined as a good product by the second determination unit 51. FIG. 8 shows an image G4 with a quality determination result with respect to a determination target object that is determined as a defect product by the second determination unit 51. In FIGS. 7 and 8, the determination target portion pb hatched with diagonal lines is a determination target portion p that is determined as "defect," and the determination target portion pg hatched with dots is a determination target portion p that is determined as "good". In this embodiment, the second determination unit 51 determines that a determination target object having the determination target portion pb is a "defect product". The second determination unit 51 determines that a determination target object of which all the determination target portions p are determined as a good is a "good product".

Returning to FIG. 1, the inspection database 60 stores an inspection image of each determination target object and the image with a quality determination result.

The transmission device 90 transmits the image with a quality determination result accumulated in the inspection database 60 to the learning device 70 through the network.

In the learning device 70, the image with a quality determination result is transmitted from the transmission device 90 and accumulated. The learning device 70 performs learning from the quality determination result of the determiner with respect to the determination target portion p.

Figure 9:
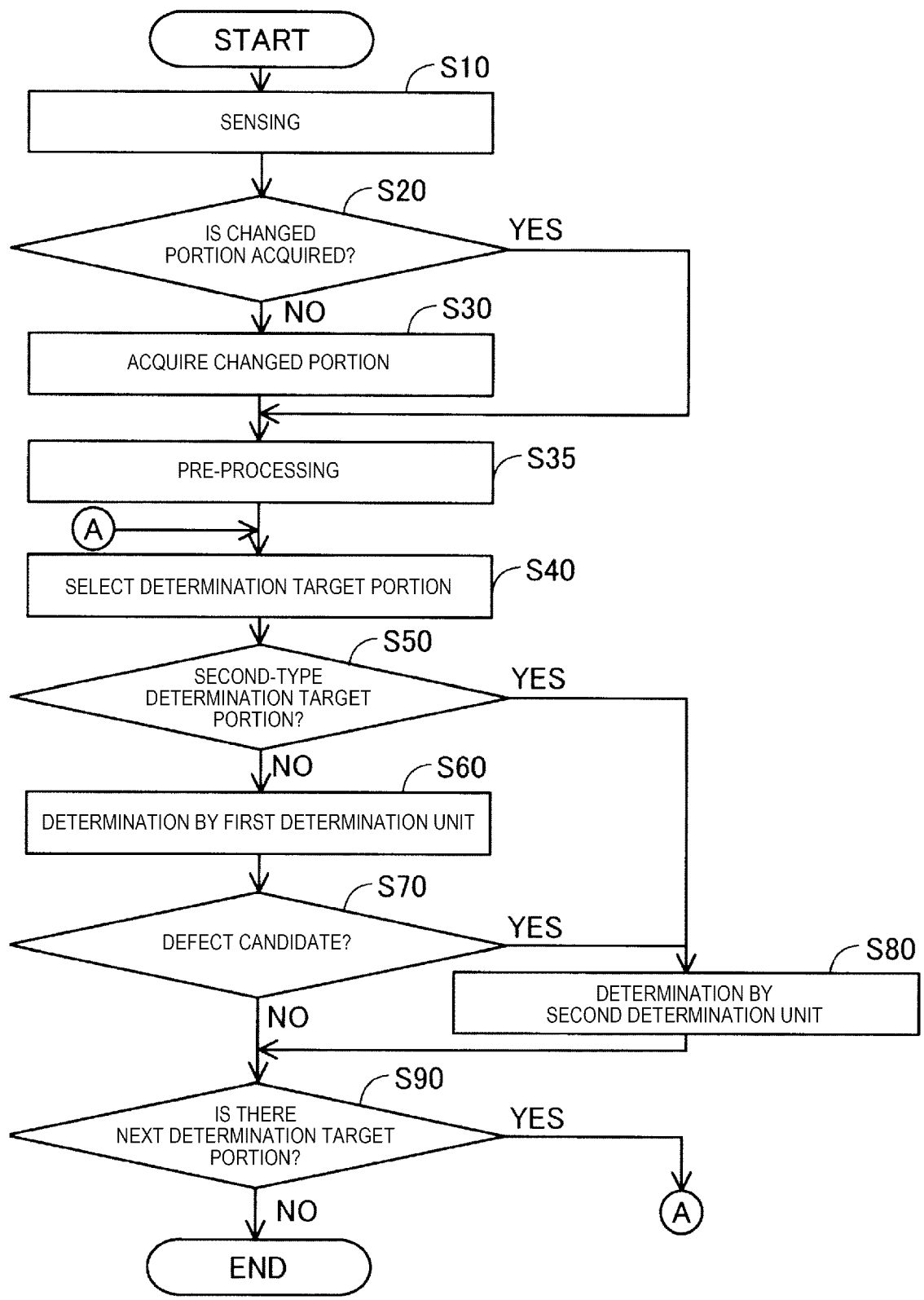
FIG. 9 is a flowchart showing quality determination processing in a determination system.

FIG. 9 is a flowchart showing quality determination processing in a determination system 5. In this processing, it is assumed that the current determination target object is partially changed from the previous determination target object. The quality determination processing shown in FIG. 9 starts by inputting a determination start command into the determination execution unit 44 of the automatic classification device 40 through an input device (not shown) by a manager of the determination system 5 and the like, for example.

At step S10, the sensing unit 21 of the inspection device 20 senses the determination target object and acquires a result of sensing. In this embodiment, the sensing unit 21 acquires an inspection image, as a result of sensing, in which a determination target object is captured.

At step S20, the determination execution unit 44 determines whether or not a changed portion CP is acquired with respect to the determination target object sensed at step S10. When a changed portion CP is not acquired, the determination execution unit 44 moves to step S30.

Figure 10:
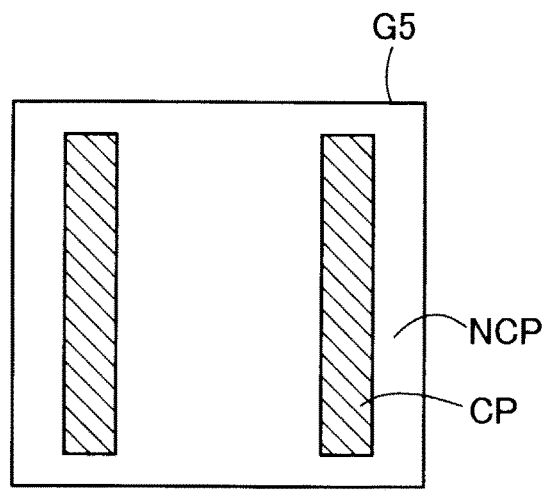
FIG. 10 is a diagram for explaining how to acquire a changed portion at step S30.

FIG. 10 is a diagram for explaining how to acquire a changed portion CP at step S30. At step S30, an inspection image G5 as a result of sensing is displayed on the display device 30. In the inspection image G5, the hatched portion is a changed portion CP, and the non-hatched portion is a non-changed portion NCP. In this embodiment, a manager of the determination system 5 or a determiner designates a changed position from the previous determination target object of the inspection image G5 through an input device (not shown). The changed portion acquisition unit 41 acquires the designated position as a changed portion CP, and acquires the non-designated portion as a non-changed portion NCP.

At step S35, the result of sensing of the determination target object is provided to the automatic classification device 40. The pre-processing unit 42 of the automatic classification device 40 performs the pre-processing described in FIG. 2.

Figure 11:
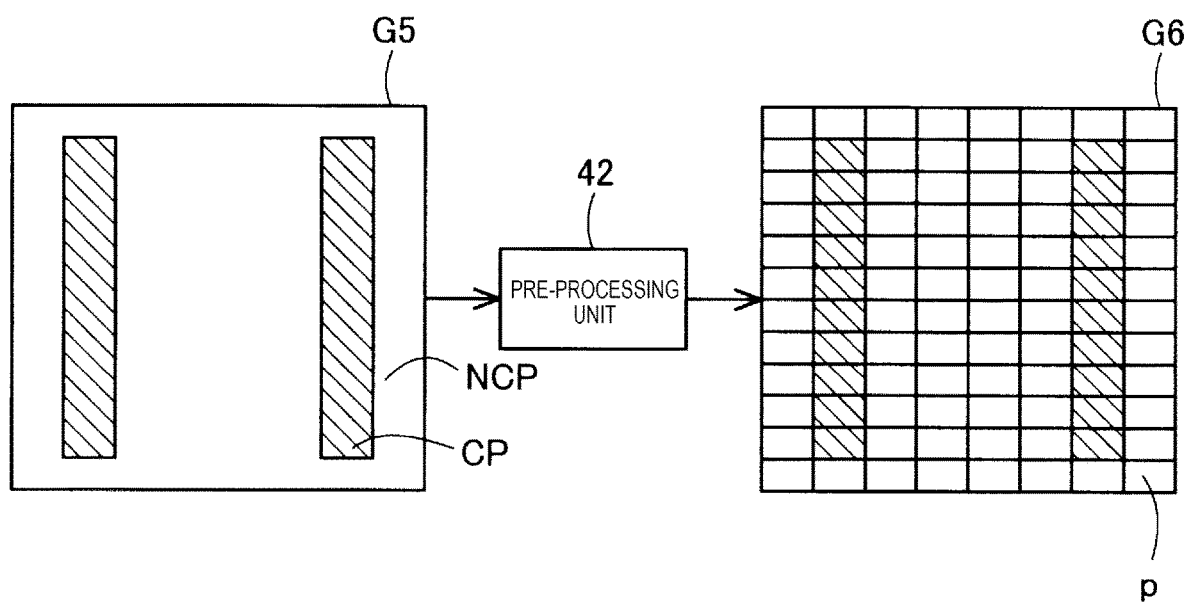
FIG. 11 is a diagram showing an inspection image before pre-processing and an inspection image after the pre-processing, in which a changed portion is designated.

FIG. 11 is a diagram showing an inspection image G5 before pre-processing and an inspection image G6 after pre-processing, in which the changed portion CP is designated. At step S30, as shown in FIG. 11, the pre-processing unit 42 divides the inspection image G5 in which the changed portion CP is designated, into a plurality of determination target portions p, and obtain an inspection image G6 after pre-processing. The pre-processing unit 42 classifies a plurality of pre-processed determination target portions p into a determination target portion p that does not include the changed portion CP, that is, a determination target portion p formed of the non-changed portion NCP, and a determination target portion p that includes the changed portion CP. Hereinafter, the determination target portion p that does not include the changed portion CP is referred to as a "first-type determination target portion P1", and the determination target portion p that includes the changed portion CP is referred to as a "second-type determination target portion P2". Additionally, step S30 is referred to as a "changed portion acquisition step".

Figure 12:
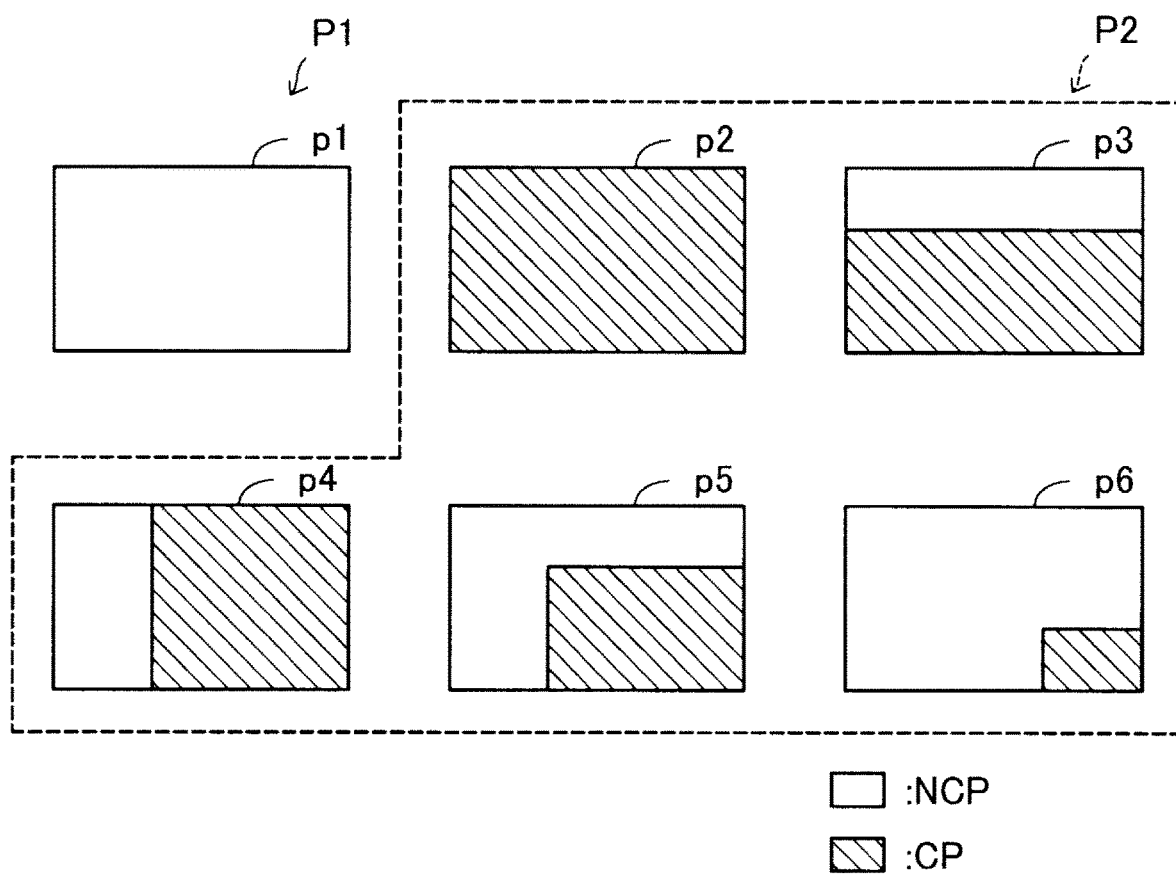
FIG. 12 is a diagram showing a first-type determination target portion and a second-type determination target portion.

FIG. 12 is a diagram showing the first-type determination target portion P1 and the second-type determination target portion P2. Among the determination target portions p1 to p6 shown in FIG. 12, the determination target portion p1, which is formed of the non-changed portions NCP only, is the first-type determination target portion P1. Since the other determination target portions p2, p3, p4, p5, and p6 include the changed portion CP, they are the second-type determination target portion P2.

At step S40, the determination target portion p in the determination target object is selected. The determination target portion p selected at step S40 is a determination target portion p for which the quality determination is not performed, among a plurality of determination target portions p in the determination target object.

At step S50, the determination execution unit 44 determines whether or not the determination target portion p selected at step S40 is the second-type determination target portion P2. When the determination target portion p selected at step S40 is the first-type determination target portion P1, the determination execution unit 44 moves to step S60.

At step S60, the determination execution unit 44 causes the first determination unit 43 of the automatic classification device 40 to perform determination with respect to the first-type determination target portion P1. Step S60 is referred to as the "first determination step".

Figure 13:
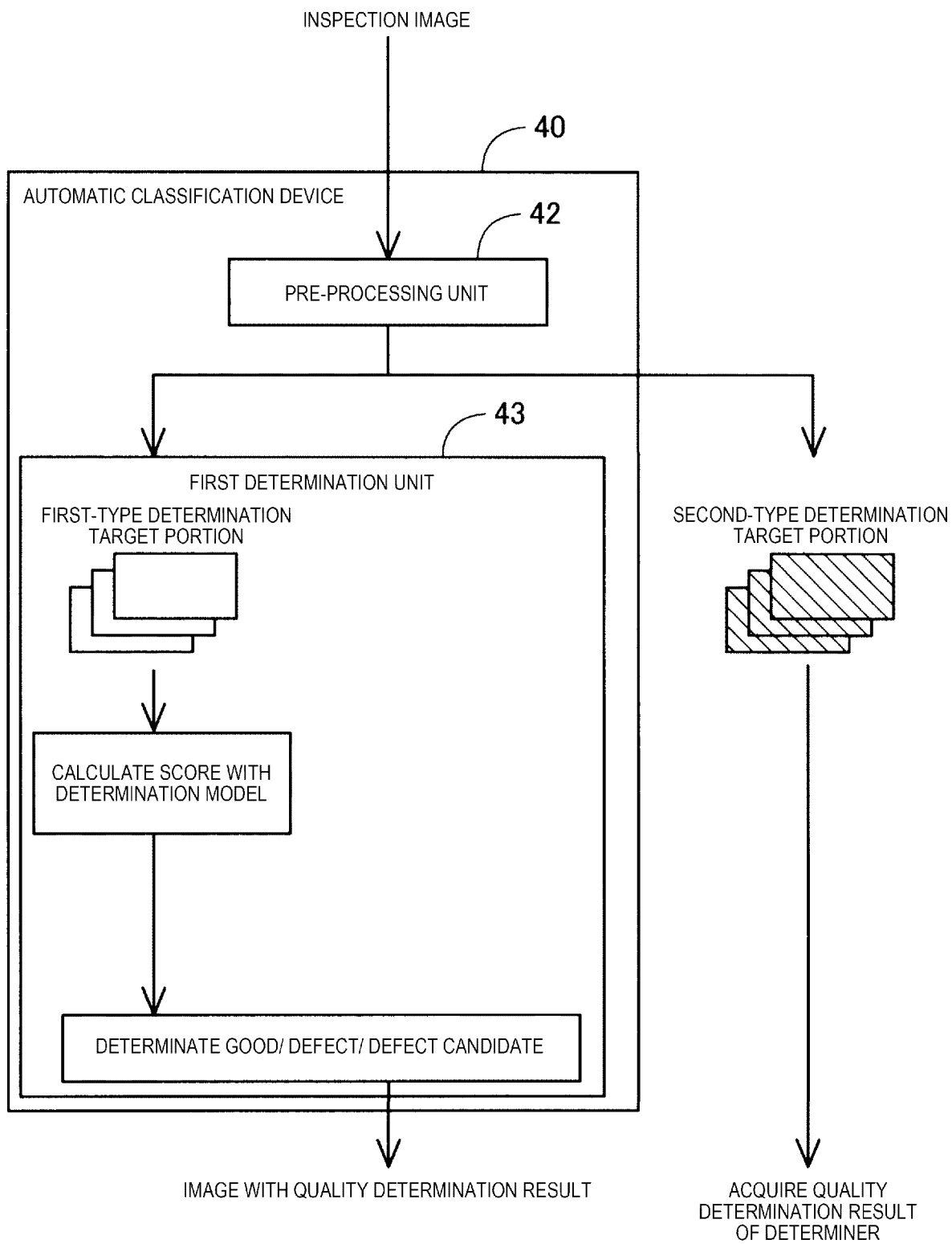
FIG. 13 is an image diagram showing quality determination processing according to a first embodiment.

FIG. 13 is an image diagram of quality determination processing according to a first embodiment. In the automatic classification device 40, as described above, the pre-processing is performed at the pre-processing unit 42 at step S35, in which the determination target object including a changed portion CP is divided into the determination target portions p. The first determination unit 43 calculates determination scores for determining labels representing respectively good and defect with respect to the first-type determination target portion P1 that does not include the changed portion CP by using the determination model, and determines any one of good, defect, and a defect candidate by using a threshold value. In this embodiment, the determination execution unit 44 does not cause the first determination unit 43 to perform determination with respect to the second-type determination target portion P2 that includes the changed portion CP.

At step S70, when the determination result of the first-type determination target portion P1 is the defect candidate, the determination execution unit 44 moves to step S80. When the determination result of the first-type determination target portion P1 is good or defect, the determination execution unit 44 moves to step S90.

At step S80, the determination execution unit 44 causes the second determination unit 51 to acquire a quality determination result with respect to the determination target portion p. At step S80, the second determination unit 51 acquires a label representing the quality determination result of the determiner for any one of the first-type determination target portion P1 that is determined as the defect candidate, and the second-type determination target portion P2. Step S80 is also referred to as the "second determination step". By performing the processes from step S50 to step S80, the quality determination result of the determination target portion p selected at step S40 is acquired.

At step S90, the determination execution unit 44 returns to step S40 when there is a determination target portion p for which the quality determination result is not acquired. When the quality determination results are acquired with respect to all the determination target portions p of the determination target object, the determination execution unit 44 classifies the determination target object of interest into one of a good product or a defect product in the visual inspection device 50 as described above, and ends the quality determination processing with respect to the determination target object.

According to the above aspect, by causing the first determination unit 43 to perform determination with respect to the first-type determination target portion P1 that does not include the changed portion CP using the determination model, and to perform acquisition of the quality determination result of the determiner with respect to the second-type determination target portion P2 that includes the changed portion CP, it is possible to suppress the increase in the number of determination target portions for quality determination by the determiner when the determination target object includes the changed portion CP from the previous determination target object, thereby performing quality determination with efficiency. Therefore, it is possible to suppress increase in cost associated with the quality determination of the determination target object that includes a changed portion CP from the previous determination target object. Further, with respect to the determination target object of which a portion of design is changed from the previous determination target object, it is possible to suppress deterioration in accuracy of the determination that may be caused due to use of the determination model used in the determination of the previous determination target object and the reference for quality determination as they are.

According to the above aspect, with respect to the second-type determination target portion P2, the determination execution unit 44 does not cause the first determination unit 43 to perform determination, but causes the second determination unit 51 to perform acquisition of the quality determination result, thereby suppressing erroneous quality determination at the first determination unit 43 of the second-type determination target portion P2 that includes the changed portion CP.

B. Second Embodiment

In the determination system 5 of the second embodiment, with respect to the second-type determination target portion P2, the determination execution unit 44 sets a reference for determining good and a reference for determining defect in the first determination unit 43 to be stricter than those with respect to the first-type determination target portion P1, and causes the first determination unit 43 to perform determination. Further, the determination execution unit 44 causes the second determination unit 51 to perform acquisition of a quality determination result with respect to the second-type determination target portion P2 that is determined as the defect candidate by the first determination unit 43. Since the rest of the configuration of the determination system 5 is same as that of the first embodiment, description thereof will be omitted.

Figure 14:
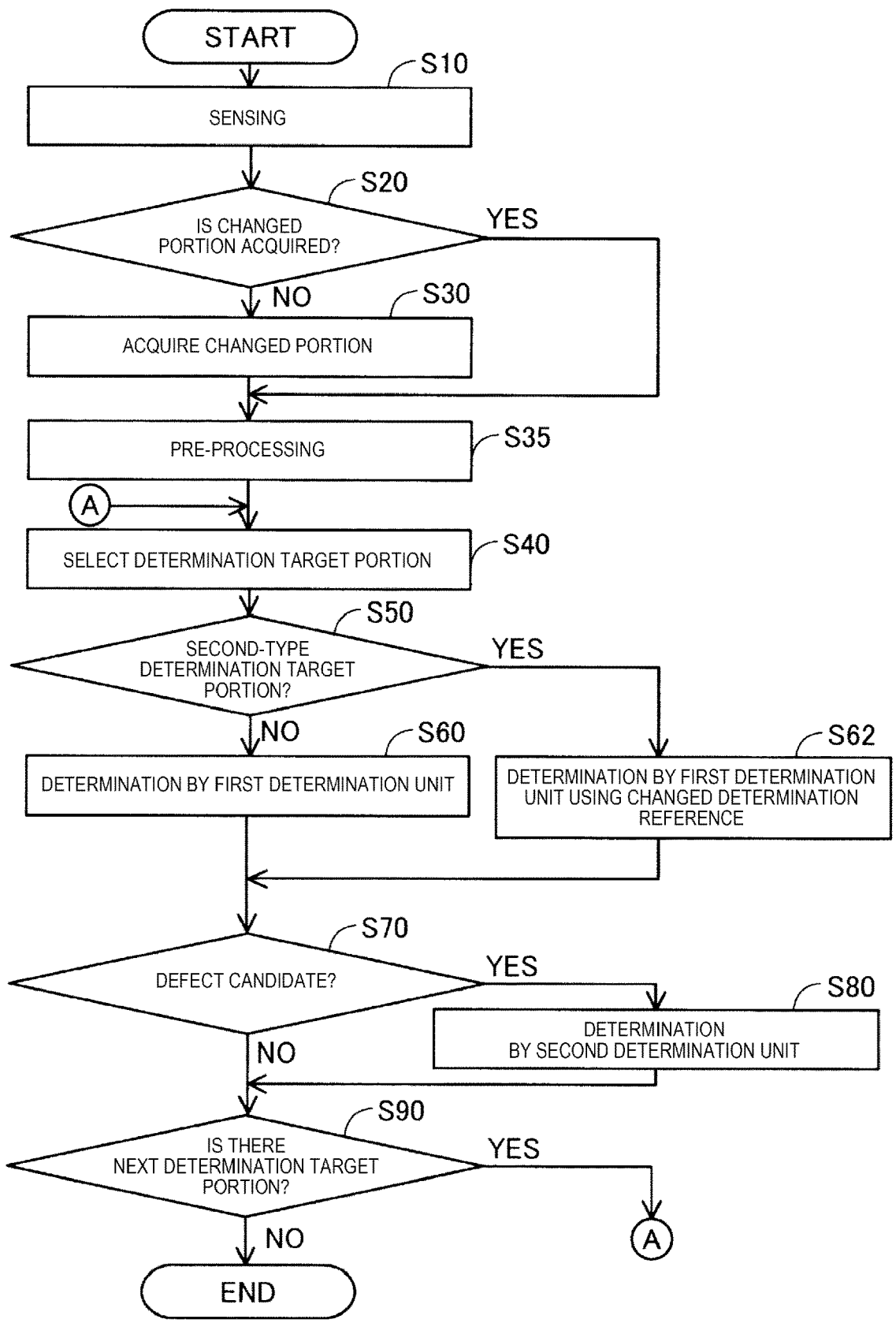
FIG. 14 is a flowchart showing quality determination processing according to a second embodiment.

FIG. 14 is a flowchart describing quality determination processing according to a second embodiment. In FIG. 14, step S62 is added to the steps of FIG. 9, and the other steps are same as in FIG. 9. At step S50, when the determination target portion p is the second-type determination target portion P2 that includes the changed portion CP, the processing moves to step S62.

At step S62, the determination execution unit 44 causes the first determination unit 43 to perform determination with respect to the second-type determination target portion P2. In this processing, with respect to the second-type determination target portion P2, the determination execution unit 44 sets a threshold value for determining good or defect in the first determination unit 43 to be higher than that with respect to the first-type determination target portion P1, and causes the first determination unit 43 to perform determination.

Figure 15:
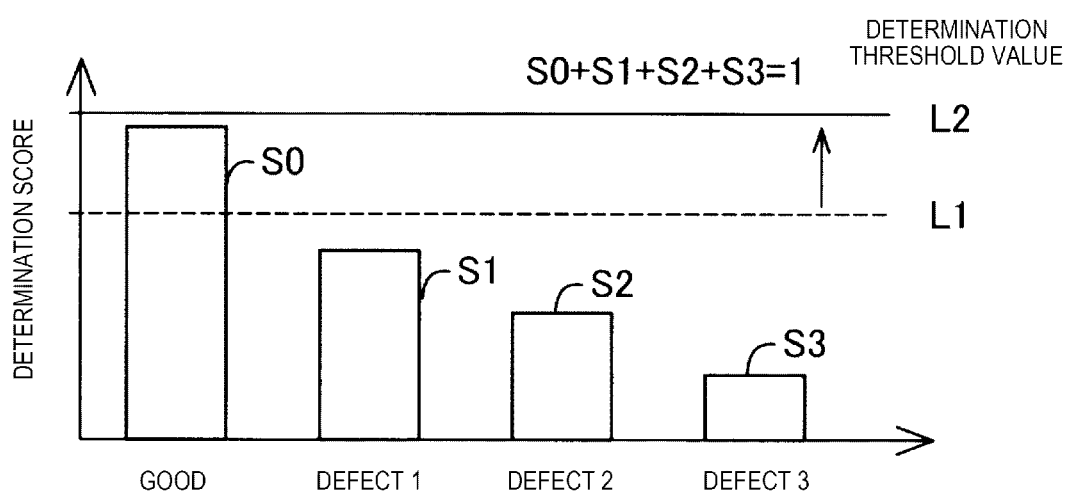
FIG. 15 is a diagram showing an image of determination at step S62.

FIG. 15 is a diagram showing an image of determination at step S62. The broken line L1 shown in FIG. represents a determination threshold value for the first-type determination target portion P1, and the solid line L2 represents a determination threshold value for the second-type determination target portion P2. An example will be described below, in which the determination scores S0, S1, S2, and S3 for determining labels representing respectively good, defect 1, defect 2 and defect 3 shown in FIG. 15 are obtained with respect to some determination target portions p according to the determination model. When a determination target portion p of interest is the first-type determination target portion P1, the first determination unit 43 determines that the corresponding determination target portion p is good because the determination score S0 for determining a label representing good exceeds a determination threshold value indicated by the broken line L1. When a determination target portion p of interest is the second-type determination target portion P2, the first determination unit 43 determines that the corresponding determination target portion p is a defect candidate because all the determination scores remain under a determination threshold value indicated by the solid line L2 which has a higher threshold value compared to the broken line L1.

Figure 16:
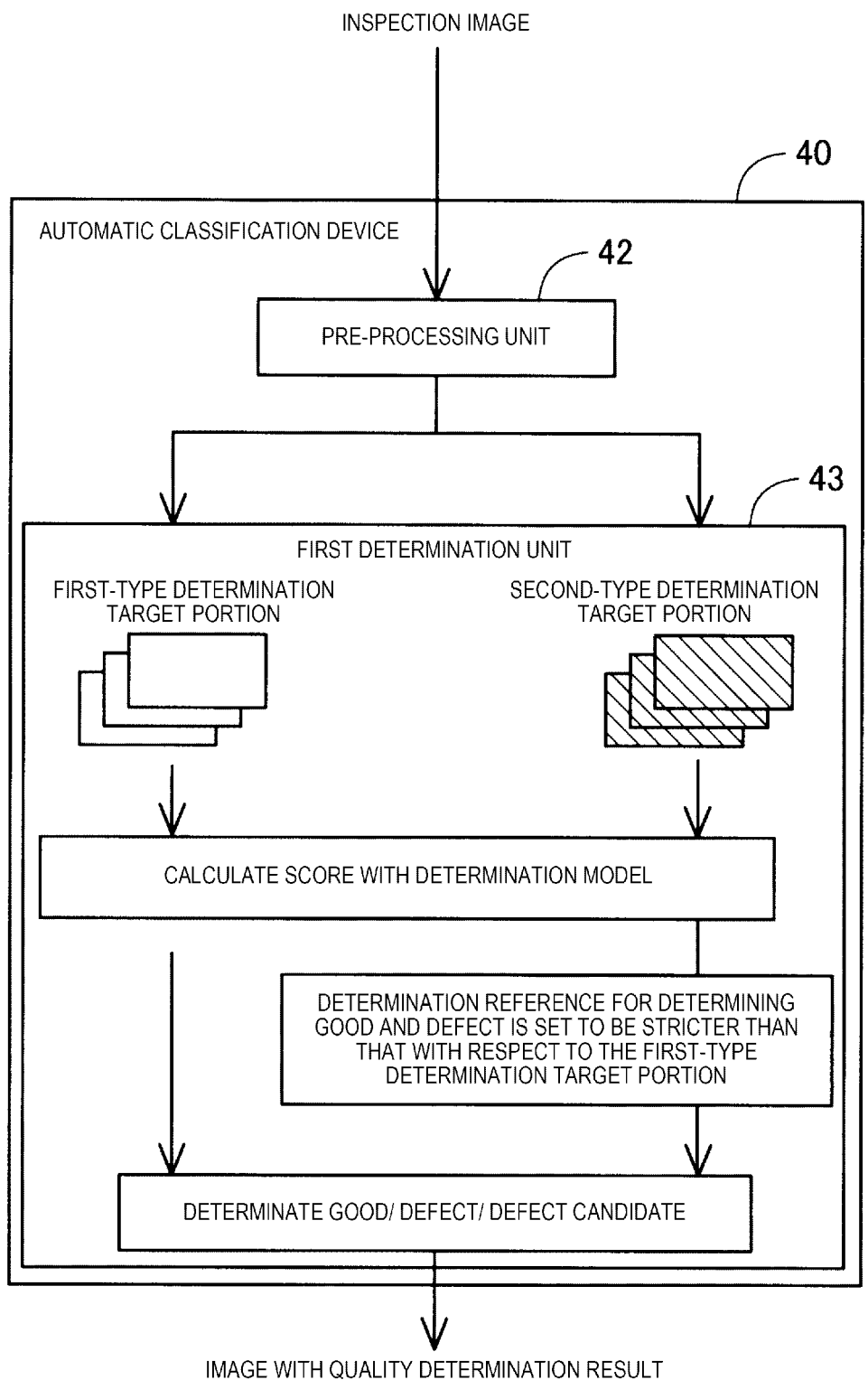
FIG. 16 is an image diagram showing quality determination processing according to the second embodiment.

FIG. 16 is an image diagram of quality determination processing according to the second embodiment. After the pre-processing unit 42 performs pre-processing to divide the determination target object including a changed portion CP into the determination target portions p, the first determination unit 43 calculates a determination score for determining good and defect by using the determination model with respect to the first-type determination target portion P1 and the second-type determination target portion P2. Meanwhile, with respect to the second-type determination target portion P2, the determination reference for determining good and defect is set to be stricter than that with respect to the first-type determination target portion P1 so as to reduce the probability of being determined as good or defect and increase the probability of being determined as a defect candidate. Specifically, the first determination unit 43 determines the first-type determination target portion P1 is anyone of good, defect, and a defect candidate by using the threshold value indicated by the broken line L1 in FIG. 15. The first determination unit 43 determines the second-type determination target portion P2 is any one of good, defect, and a defect candidate by using the threshold value indicated by the solid line L2 in FIG. 15 which is set to be higher than that with respect to the first-type determination target portion P1.

At step S80, acquisition of a quality determination result of the determiner is performed at the second determination unit 51, with respect to the first-type determination target portion P1 and the second-type determination target portion P2 which are determined as the defect candidate by the first determination unit 43. Among the second-type determination target portions P2, the determination target portion p that is determined as a good or defect at step S62 is not the subject of the quality determination by the determiner.

According to this embodiment, with respect to the second-type determination target portion P2, the determination execution unit 44 sets the reference for determining good and the reference for determining defect in the first determination unit 43 to be stricter than those with respect to the first-type determination target portion P1, and causes the first determination unit 43 to perform determination, and causes the second determination unit 51 to perform acquisition of a quality determination result with respect to the second-type determination target portion P2 that is determined as the defect candidate by the first determination unit 43. Therefore, when a determination target object includes a changed portion CP from the previous determination target object, it is possible to suppress increase in the number of determination target portions for quality determination by the determiner, and perform quality determination more effectively. Therefore, it is possible to further suppress increase in cost associated with the quality determination of the determination target object that includes a changed portion CP from the previous determination target object. Further, the determination is performed by the first determination unit 43 by using the reference set to be stricter with respect to the second-type determination target portion P2 than that with respect to the first-type determination target portion P1, so that it is possible to suppress the erroneous determination of the quality of the second-type determination target portion P2.

C. Third Embodiment

Figure 17:
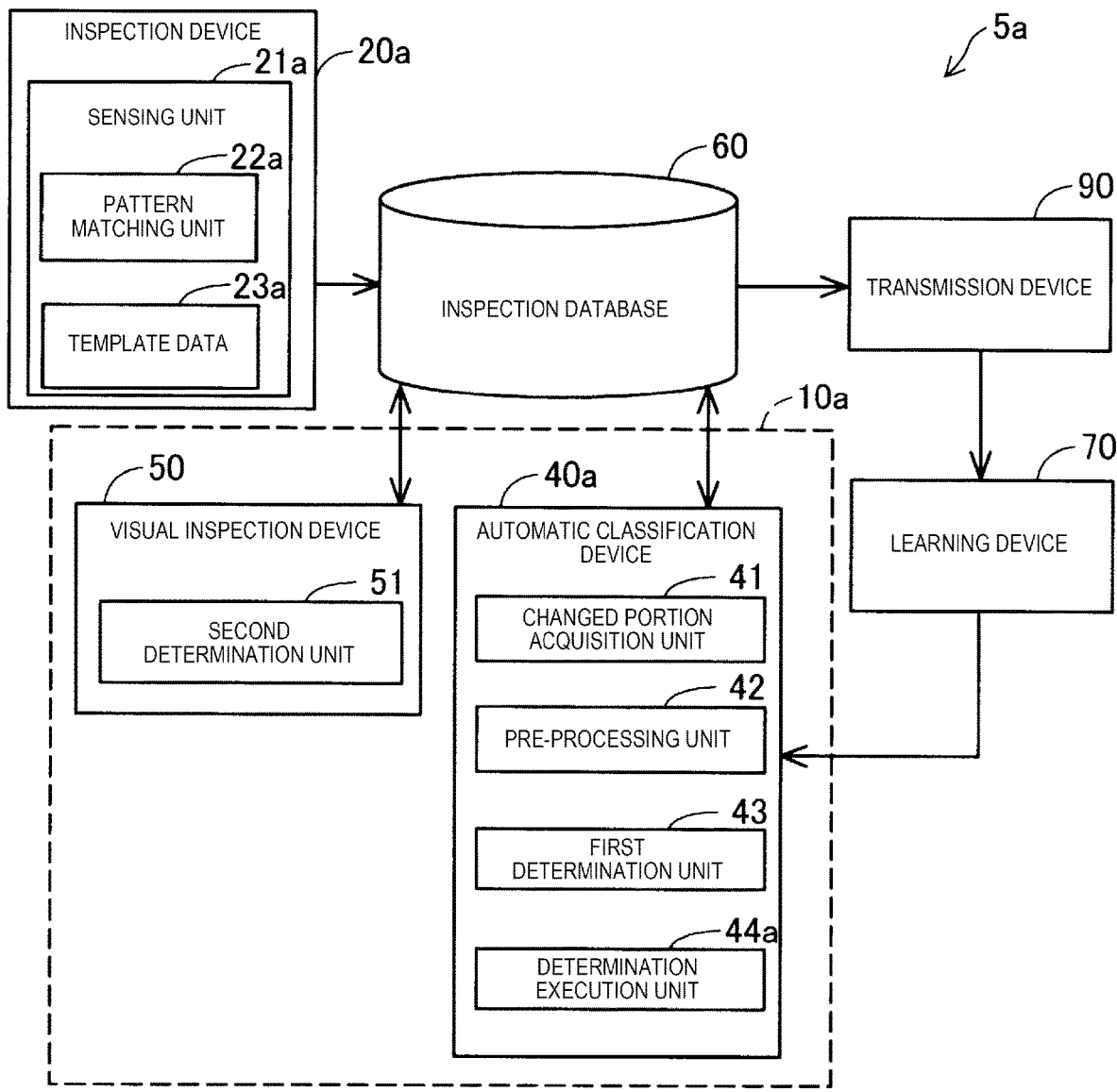
FIG. 17 is a diagram showing schematic configuration of a determination system according to a third embodiment.

FIG. 17 is a diagram showing schematic configuration of a determination system 5a according to the third embodiment. The determination system 5a is different from the determination system 5 shown in FIG. 1 in that the sensing unit 21a includes a pattern matching unit 22a and template data 23a, while the rest of the configuration is the same as in FIG. 1. In the determination system 5a, the sensing unit 21a of the inspection device 20a determines whether or not the determination target object needs to be determined by the determination device 10a. Further, in the determination system 5a, the determination execution unit 44a of the automatic classification device 40a performs the quality determination processing described above with respect to the determination target portion p in the determination target object, which is necessary to be determined by the sensing unit 21a.

Figure 18:
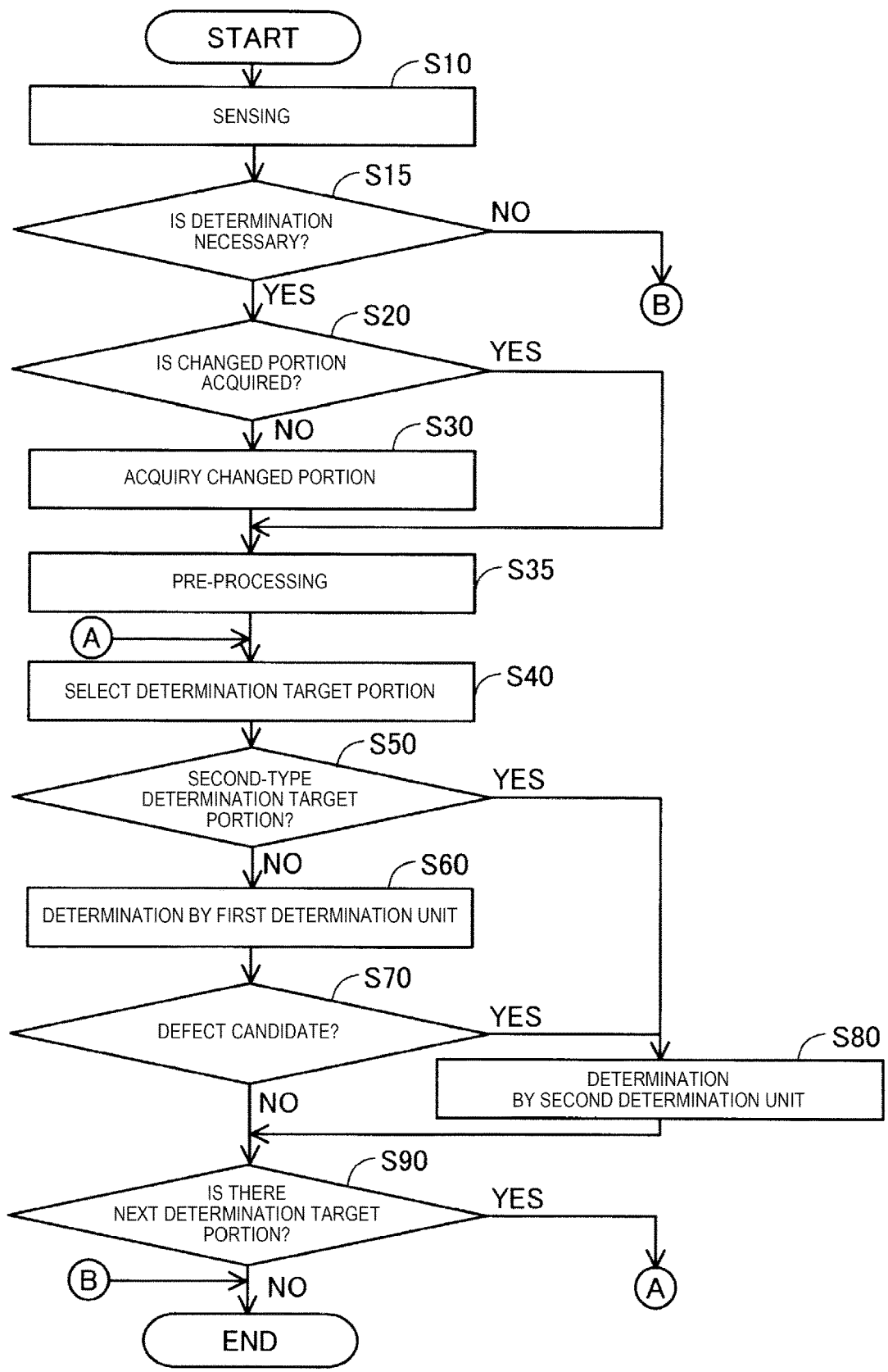
FIG. 18 is a flowchart showing quality determination processing according to the third embodiment.

FIG. 18 is a flowchart showing quality determination processing according to the third embodiment. In FIG. 18, step S15 is added to the steps of FIG. 9, and the other steps are the same as in FIG. 9. When the determination target object is sensed at the sensing unit 21a, the processing moves to step S15.

At step S15, the pattern matching unit 22a classifies the determination target object into a good product and a defect candidate product by using the template data 23a recorded in advance. For example, the pattern matching unit 22a compares the result of sensing acquired at step S10 with the template data 23a recorded in advance in the inspection device 20a within a predetermined position range of the determination target object. When a width dimension in the result of sensing is within a predetermined width based on the template data 23a, the pattern matching unit 22a determines that the determination target object is a good product, and when exceeding the predetermined width, the pattern matching unit 22a classifies the determination target object to be the defect candidate product. The sensing unit 21a assigns the determination result of the good product and the defect candidate product to the inspection image as a result of sensing, and stores the result in the inspection database 60. The determination execution unit 44a determines whether or not determination by the determination device 10a is necessary with respect to the sensed determination target object. The determination execution unit 44a determines that the determination target object that is determined as a good product by the sensing unit 21a does not need to be determined by the determination device 10a, and determines that the determination target object that is determined as a defect candidate product by the sensing unit 21a needs to be determined by the determination device 10a.

According to this embodiment, the determination execution unit 44a performs the quality determination processing at the determination device 10a with respect to the determination target portion p in the determination target object for which the sensing unit 21a determines that the determination is necessary, thereby reducing the number of determination target portions p for quality determination at the determination device 10a. Therefore, it is possible to further suppress increase in the number of determination target portions for quality determination by the determiner.

Note that the third embodiment may be combined with the second embodiment, and step S15 may be added to FIG. 14.

D. Other Embodiments

D1. Another Embodiment 1

Figure 19:
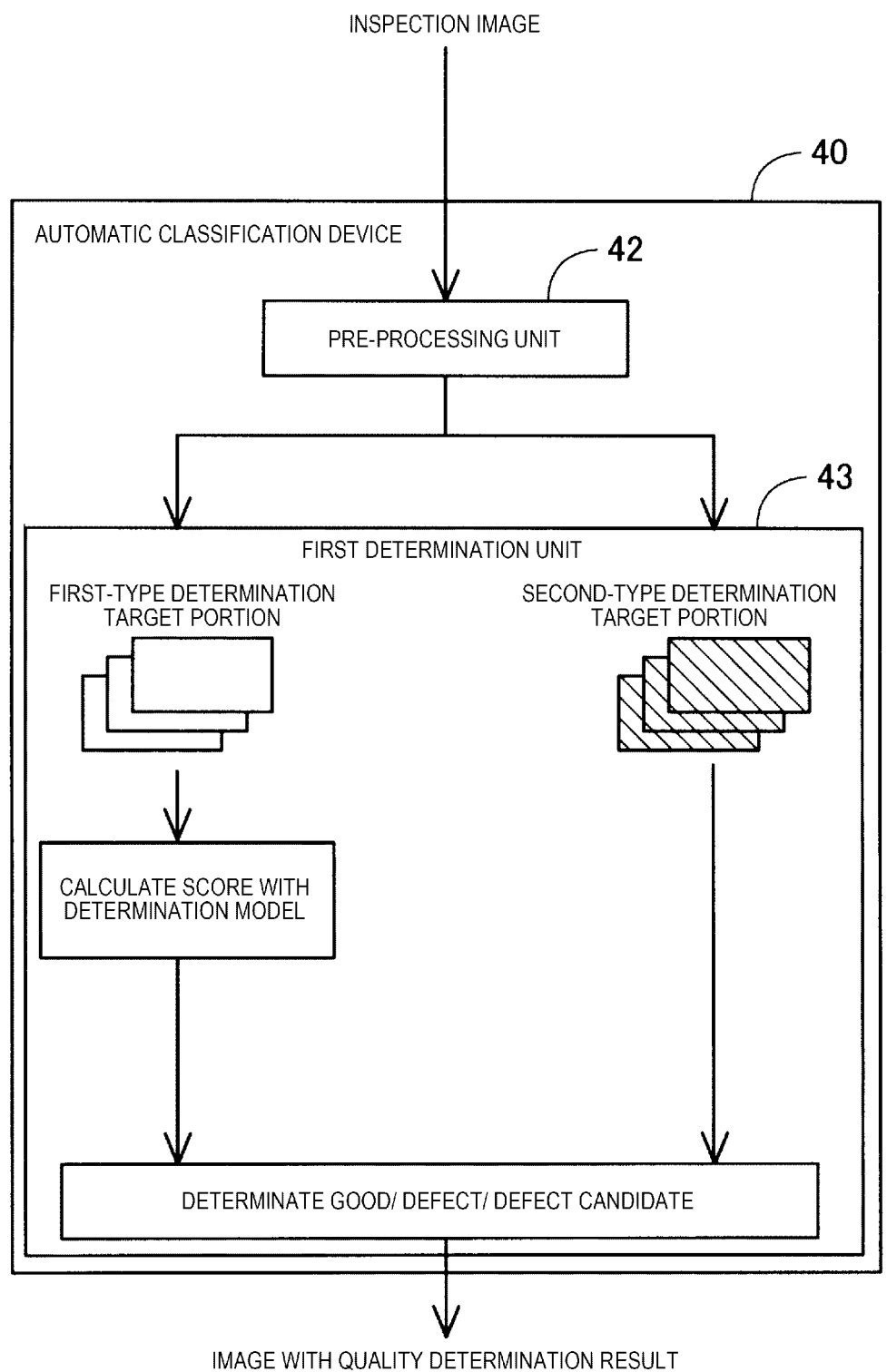
FIG. 19 is a diagram showing an image of the quality determination processing according to another embodiment.

FIG. 19 is a diagram showing an image of the quality determination processing according to another embodiment 1. In the first embodiment described above, as shown in FIG. 13, the determination execution unit 44 does not cause the first determination unit 43 to perform determination with respect to the second-type determination target portion P2, but causes the second determination unit 51 to perform acquisition of the quality determination result of the determiner. On the other hand, the first determination unit 43 is configured to determine that the second-type determination target portion P2 is a "defect candidate" and the determination execution unit 44 causes the first determination unit 43 to perform determination with respect to the second-type determination target portion P2. Also in this embodiment, all the second-type determination target portions P2 are subjected to the quality determination by the determiner as in the first embodiment described above. Therefore, as in the first embodiment, it is possible to suppress the erroneous quality determination at the first determination unit 43 of the second-type determination target portion P2 that includes the changed portion CP.

D2. Another Embodiment 2

In the above aspects, instead of being included in the automatic classification devices 40 and 40*a*, the determination execution units 44 and 44*a* may be included in the visual inspection device 50 included in the determination devices 10 and 10*a*, or the learning device 70 included in the determination systems 5 and 5*a*, or other devices coupled to the determination systems 5 and 5*a* through a network. In this case, a device that implements the functions of the first determination unit 43, the second determination unit 51, and the determination execution units 44 and 44*a* may be referred to as the "determination device".

D3. Another Embodiment 3

In the above aspects, the sensing units 21 and 21*a* may acquire a result other than an image, such as smell, taste, sound, and the like with respect to the object.

D4. Another Embodiment 4

In the above aspects, the learning device 70 may perform learning by using a quality determination result of a determiner with respect to the second-type determination target portion P2. The determination execution units 44 and 44*a* may cause the learning device 70 to prioritize learning from a quality determination result of the determiner with respect to the second-type determination target portion P2 to that with respect to the first-type determination target portion P1. For example, the determination execution units 44 and 44*a* may store, in the inspection database 60, an image with a quality determination result which is assigned with a label for identifying the second-type determination target portion P2 of the determination target portions, and the learning device 70 may set a frequency of learning or a weight of learning from the quality determination result of the determiner with respect to the determination target portion that is assigned with a label, to be higher than the frequency of learning from the quality determination result that is not assigned with a label. Further, the learning device 70 may evaluate the determination model learned by using the quality determination result of the determiner with respect to the second-type determination target portion P2, by the cross validation method, for example. The determination execution units 44 and 44*a* may determine that the second-type determination target portion P2 can be determined by corresponding determination model when an evaluation result of the learned determination model satisfies a predetermined condition. When configured to determine the second-type determination target portion P2 to be good, defect, and a defect candidate by the determination model, the determination execution units 44 and 44*a* may not acquire the changed portion CP by the changed portion acquisition unit 41, and cause the first determination unit 43 to perform determination with respect to the determination target portion p, and cause the second determination unit 51 to perform acquisition of a quality determination result with respect to the determination target portion p that is determined as a defect candidate by the first determination unit 43.

D5. Another Embodiment 5

According to the above aspects, the changed portion CP is generated by a design change of the previous determination target object, but the changed portion CP may be also generated by a change in a manufacturing process of the determination target object from that of the previous determination target object.

E. Other Embodiments

The present disclosure is not limited to the embodiments described above, and may be realized in various forms without departing from the gist thereof. For example, the present disclosure may be also realized by following embodiments. The technical features in the above aspects corresponding to technical features in each of the embodiments described below may be replaced or combined appropriately in order to solve a part or all of the problems of the present disclosure or in order to achieve a part or all of the effects of the present disclosure. Further, when the technical features are not described as essential in the specification, it may be deleted appropriately.

(1) According to a first aspect of the present disclosure, there is provided a determination device that determines quality of a determination target portion obtained from a result of sensing with respect to a determination target object by a sensing unit. The determination device includes a changed portion acquisition unit that acquires a changed portion in the determination target object from a previous determination target object, a first determination unit that determines the determination target portion as anyone of good, defect, and a defect candidate by using a determination model learned from a quality determination result of a determiner with respect to the determination target portion, a second determination unit that acquires the quality determination result of the determiner with respect to the determination target portion, a determination execution unit that performs quality determination processing with respect to the determination target portion by using at least one of the first determination unit and the second determination unit, in which, in the quality determination processing, the determination execution unit causes the first determination unit to perform determination with respect to a first-type determination target portion which is a determination target portion that does not include the changed portion, and, when the first-type determination target portion is determined as the defect candidate by the first determination unit, causes the second determination unit to perform acquisition of the quality determination result with respect to the first-type determination target portion, and causes the second determination unit to perform acquisition of the quality determination result with respect to the second-type determination target portion which is the determination target portion that includes the changed portion. According to the above aspect, by causing the first determination unit to perform determination with respect to the first-type determination target portion that does not include the changed portion by using the determination model, and to perform acquisition of a quality determination result of a determiner with respect to the second-type determination target portion that includes the changed portion, it is possible to suppress the increase in the number of determination target portions for quality determination by the determiner when the determination target object includes the changed portion from the previous determination target object, thereby performing quality determination with efficiency.

(2) According to the above aspect, the determination execution unit does not cause the first determination unit to perform determination, and causes the second determination unit to perform acquisition of a quality determination result with respect to the second-type determination target portion. According to this aspect, it is possible to suppress erroneous quality determination at the first determination unit of the second-type determination target portion that includes the changed portion.

(3) According to the above aspect, the determination execution unit may set a determination reference for determining good and defect in the first determination unit to be stricter with respect to the second-type determination target portion than that with respect to the first-type determination target portion so as to reduce the probability of being determined as good or defect and increase the probability of being determined as a defect candidate, and cause the first determination unit to perform determination, and, when the second-type determination target portion is determined as the defect candidate by the first determination unit, cause the second determination unit to perform acquisition of a quality determination result with respect to the second-type determination target portion. According to this aspect, when the determination target object includes a changed portion from a previous determination target object, it is possible to suppress increase in the number of determination target portions for quality determination by the determiner and perform quality determination more efficiently. Therefore, it is possible to further suppress increase in cost associated with the quality determination of the determination target object that includes a changed portion from the previous determination target object. Further, determination is performed by the first determination unit by using a reference that is set to be stricter with respect to the second-type determination target portion than that with respect to the first-type determination target portion, so that it is possible to suppress the erroneous determination of quality of the second-type determination target portion.

(4) According to the above aspect, the determination execution unit may perform the quality determination processing with respect to the determination target portion in the determination target object for which the sensing unit determines that the determination is necessary. According to this aspect, when the determination target object includes the changed portion from the previous determination target portion, it is possible to further suppress increase in the number of the determination target portions for quality determination by the determiner.

(5) According to the second embodiment of the present disclosure, there is provided a determining method of determining quality of a determination target portion obtained from a result of sensing a determination target object. The method includes a changed portion acquisition step of acquiring a changed portion from a previous determination target object, a first determination step of determining the determination target portion as any one of good, defect, and a defect candidate by using a determination model learned from a quality determination result of a determiner with respect to the determination target portion, and a second determination step of acquiring the quality determination result of the determiner with respect to the determination target portion, in which the first determination step performs determination with respect to a first-type determination target portion which is a determination target portion that does not include the changed portion, the second determination step performs acquisition of a quality determination result with respect to the first-type determination target portion that is determined as a defect candidate in the first determination step, and the second determination step performs acquisition of a quality determination result with respect to a second-type determination target portion which is the determination target portion that includes the changed portion. According to this aspect, determination is performed by using the determination model with respect to the first-type determination target portion that does not include the changed portion, and acquisition of a quality determination result of the determiner with respect to the second-type determination target portion that includes the changed portion, so that when the determination target object includes the changed portion from the previous determination target object, it is possible to suppress increase in the number of determination target portions for quality determination by the determiner and perform quality determination more efficiently.

The present disclosure may be also realized in various other embodiments than the determination devices 10 and 10a. For example, the present disclosure may be realized in various forms such as the determination systems 5 and 5a including the determination devices 10 and 10a, the determining method of the determination devices 10 and 10a, a computer program for implementing the method, a non-transitory storage medium recording the computer program and the like.

The entire disclosure of Japanese patent application No. 2018-221952, filed on Nov. 28, 2018, is expressly incorporated by reference herein.

What is claimed is:

1. A determination device that determines quality of a target portion of a target object based on sensor data obtained by a sensor measuring the target object, comprising one or more processors configured to:
   acquire, from the sensor or a memory, the sensor data representing the target portion;
   acquire information indicating a changed portion on the target object;
   determine whether the target portion includes the changed portion based on the acquired information;
   determine a first label of the target portion represented in the sensor data by using a determination model learned from a training dataset based on training target portions, the first label representing the target portion as one of good, defect, and a defect candidate;
   accept a second label of the target portion input via a user interface when the target portion includes the changed portion or when the first label of the target portion is determined as the defect candidate; and
   perform quality determination of the target portion based on the first label and/or the second label,
   wherein the changed portion is a portion of the target object where a design or a process applied to form the target portion has been changed from that of the training target portions used to form the training dataset.

2. A determination device according to claim 1, wherein the one or more processors are further configured to:
   skip determining the first label of the target portion when the target portion includes the changed portion.

3. A determination device according to claim 1, wherein the one or more processors are further configured to:
   when determining the first label of the target portion that includes the changed portion:

set a threshold for determining the first label between the good and the defect to be stricter than that for determining the first label of the target portion that does not includes the changed portion.

4. A determination device according to claim 1, wherein the one or more processors are further configured to:
- determine whether performing the quality determination of the target portion is necessary based on the sensor data and template data corresponding to the target portion; and
- perform the quality determination of the target portion when the quality determination of the target portion is determined to be necessary.

5. A method that determines, when performed by one or more processors, quality of a target portion of a target object based on sensor data obtained by a sensor measuring the target object, comprising:
- acquiring, from the sensor or a memory, the sensor data representing the target portion;
- acquiring information indicating a changed portion on the target object;
- determining whether the target portion includes the changed portion based on the acquired information;
- determining a first label of the target portion represented in the sensor data by using a determination model learned from a training dataset based on training target portions, the first label representing the target portion as one of good, defect, and a defect candidate;
- accepting a second label of the target portion input via a user interface when the target portion includes the changed portion or when the first label of the target portion is determined as the defect candidate; and
- performing quality determination of the target portion based on the first label and/or the second label,
- wherein the changed portion is a portion of the target object where a design or a process applied to form the target portion has been changed from that of the training target portions used to form the training dataset.

6. A non-transitory computer readable medium that stores instructions that cause one or more processors to perform a method for determining quality of a target portion of a target object based on sensor data obtained by a sensor measuring the target object, the method comprising:
- acquiring, from the sensor or a memory, the sensor data representing the target portion;
- acquiring information indicating a changed portion on the target object;
- determining whether the target portion includes the changed portion based on the acquired information;
- determining a first label of the target portion represented in the sensor data by using a determination model learned from a training dataset based on training target portions, the first label representing the target portion as one of good, defect, and a defect candidate;
- accepting a second label of the target portion input via a user interface when the target portion includes the changed portion or when the first label of the target portion is determined as the defect candidate; and
- performing quality determination of the target portion based on the first label and/or the second label,
- wherein the changed portion is a portion of the target object where a design or a process applied to form the target portion has been changed from that of the training target portions used to form the training dataset.

* * * * *